United States Patent [19]

Masumoto et al.

[11] 4,086,508
[45] Apr. 25, 1978

[54] CAN FOR USE IN CANNED MOTOR

[75] Inventors: Katashi Masumoto; Ei-ichi Furubayashi; Wahei Inoue, all of Tokyo, Japan

[73] Assignees: The Director National Research Institute for Metals; Kabushiki Kaisha Maekawa Seisakusho, both of Tokyo, Japan

[21] Appl. No.: 824,715

[22] Filed: Aug. 15, 1977

Related U.S. Application Data

[63] Continuation of Ser. No. 590,381, Jun. 25, 1975, abandoned.

[30] Foreign Application Priority Data

Jun. 29, 1974 Japan .................................. 49-73804

[51] Int. Cl.² ............................................. H02K 5/10
[52] U.S. Cl. ........................................ 310/86; 310/44; 310/216
[58] Field of Search ............. 310/85, 86, 87, 214–218; 336/218

[56] References Cited

U.S. PATENT DOCUMENTS

| | | | |
|---|---|---|---|
| 2,128,544 | 8/1938 | Surjauinoff | 310/86 |
| 2,433,660 | 12/1947 | Granfield | 310/216 X |
| 2,695,370 | 11/1954 | Brouwer | 310/44 X |
| 2,968,860 | 1/1961 | Mereuess | 310/216 X |
| 2,993,131 | 7/1961 | Trevitt | 310/214 X |

FOREIGN PATENT DOCUMENTS 147,913 9/1931 Switzerland .................... 310/214

*Primary Examiner*—Donovan F. Duggan
*Attorney, Agent, or Firm*—James E. Nilles

[57] ABSTRACT

A can for use in a canned motor made of a soft magnetic metal plate. Said metal plate has the magnetically hard direction of the texture oriented to the circumferential direction of the can body. Said metal plate also has the magnetically easy direction of the texture oriented to the normal direction of the can body.

8 Claims, 11 Drawing Figures

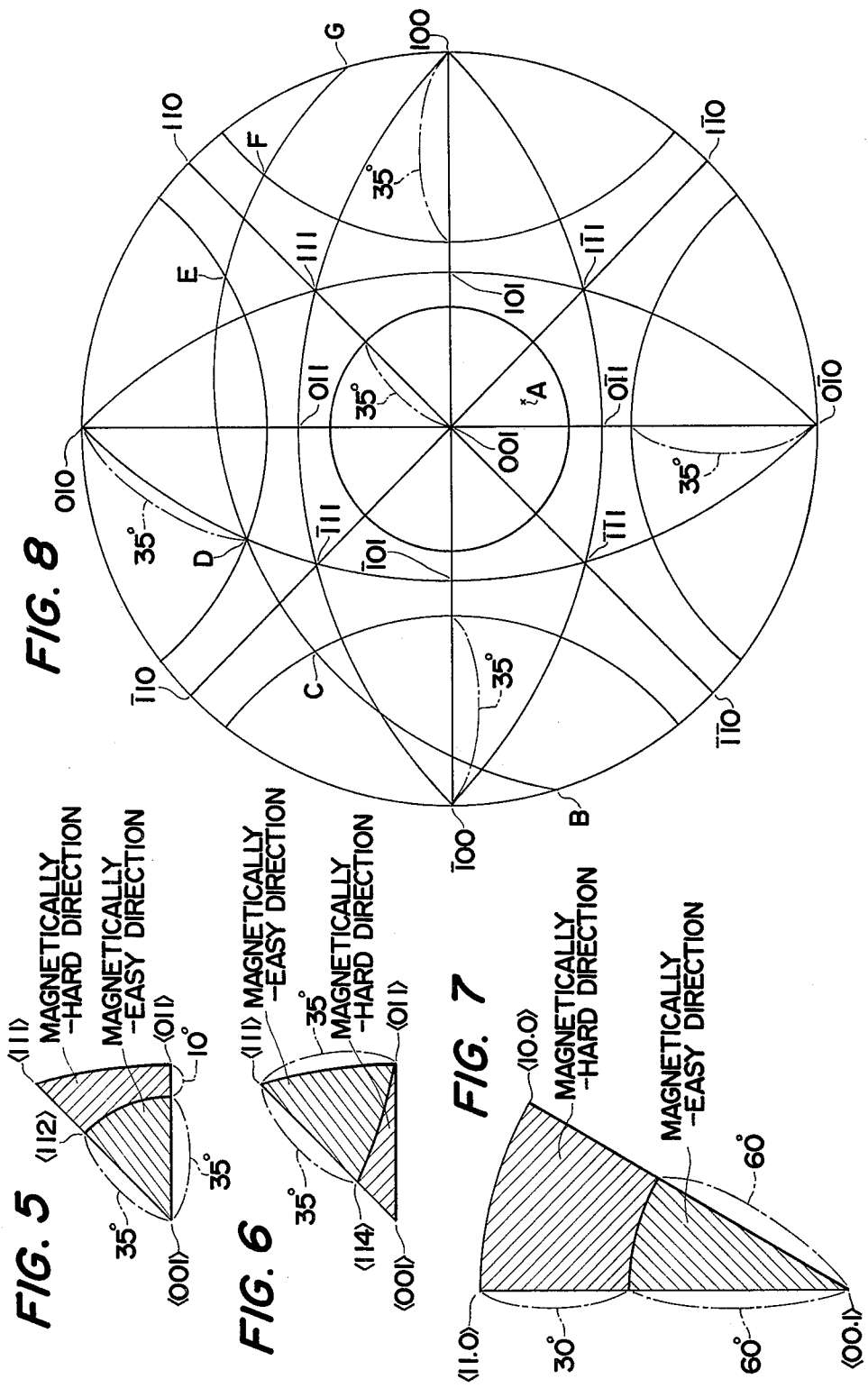

CAN FOR USE IN CANNED MOTOR

REFERENCE TO RELATED CO-PENDING APPLICATION

This application is a continuation of U.S. Ser. No. 590,381; Filed June 25, 1975, now abandoned.

The present invention relates to a can for use in a canned motor, more particularly a can having an excellent magnetization property and being made of a soft magnetic metal plate having special texture.

Intended to protect a stator coil, a core or the like from high temperature or pressure, or from a corrosive gases or liquids, the canned motor comprises fitting a thin cylindrical can into the space between a stator and a rotor to thereby air-tightly seal the rotor from the atmosphere. Since the can is used in the intense rotating magnetic field, can materials must be of high magnetic resistance and also of high electric resistance. Consequently, there have been used nonferromagnetic metals such as Inconel or austenitic steel. However, when the can made of these metals is fitted into the space between the stator and the rotor, the magnetic gap between the stator and the rotor has to be large, in spite of the gap between the can and the rotor being narrow, thus the motor efficiency and other properties being deteriorated. In addition, the pressure increase in the latest pumps and compressors requests that can materials must have a thickness enough to resist such pressure increase. This results in an inevitable increase in magnetic gap, thus making it difficult to design a canned motor of large capacity of high pressure.

For the purpose of avoiding the increase in the clearance in magnetic gap, soft magnetic metals may be used to form the can. However, the use of such soft magnetic metals causes a strong leakage of magnetic flux between adjacent magnetic poles of the stator, thus deteriorating the motor characteristics.

According to a study of magnetization curves of ferromagnetic metal single crystals, it has been known that these crystals have magnetically easy directions and hard directions depending on their orientations. Using this property, the texture of polycrystalline magnetic materials can be controlled so as to have excellent magnetization properties and such plates are in fact being now manufactured on an industrial scale. Among them there can be mentioned the core in a transformer, the rotor in a motor or the like, which are usually made of silicon steel having its texture controlled. In these cases it is intended to gain a material wherein the magnetically easy direction of the texture thereof is oriented to a special direction. To the contrary, no approach has been made to obtain a material wherein the magnetically hard direction of the texture thereof is oriented to a special direction.

An object of the present invention is to reduce the leakage of the magnetic flux formed between the adjacent magnetic poles, which is always associated with the use of soft magnetic materials, in such a manner that the can body made of soft magnetic metal plates is arranged to have its circumferential direction of the cylindrical can, perpendicular to the stator slots of the motor, oriented to the magnetically hard direction of the texture of said soft magnetic metal plate.

Another object of the present invention is to enhance the motor efficiency by orienting the circumferential direction of the can body, perpendicular to the stator slots of the motor, to the magnetically hard direction of the texture of said soft magnetic metal plate and also orienting the normal direction of the can plate to the magnetically easy direction of the texture of said soft magnetic metal plate so as to allow the magnetic flux to flow easily along the normal direction of the cylindrical can plate, when it flows from the stator to the rotor.

Other objects and features of the present invention will be apparent from the following description with reference to the accompanying drawings, in which:

FIG. 5 is a stereo-projection chart of a body centered cubic metal;

FIG. 6 is a stereo-projection chart of a face centered cubic metal;

FIG. 7 is a stereo-projection chart of a close packed hexagonal metal;

FIG. 8 is a standard stereo-projection chart of a cubic crystal;

Referring to FIGS. 1 to 4, numeral 1 represents a canned induction motor, 2 a cylindrical can body, 3 a stator, 4 a stator coil, 5 a stator slot, 6 a rotor, 7 the rotating axis of the rotor 6 and 8 a gap, respectively. Both ends of the can body 2 are provided with brackets including bearings for receiving the rotating axis 7 of the rotor 6. To one end of the rotating axis 7 extending through the bearing is connected with the rotating axis of the pump or the compressor.

Figure 2:
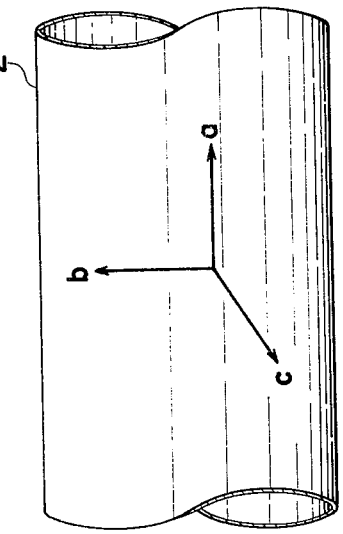
FIG. 2 is a side view showing a part of the can body.
Figure 4:
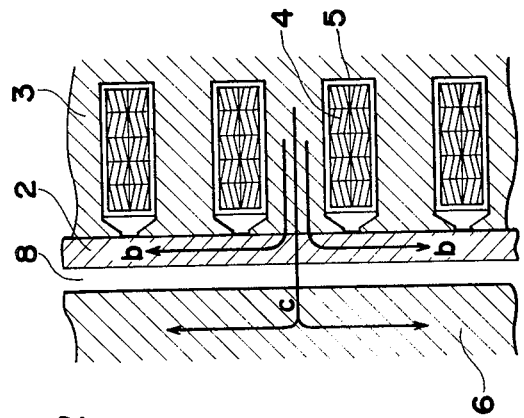
FIG. 4 is an enlarged longitudinal sectional plan view showing a part of the enveloped rotor and stator.
Figure 1:
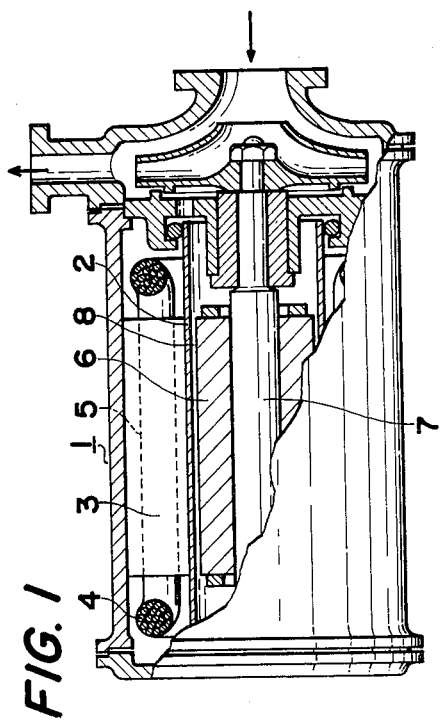
FIG. 1 is a longitudinal sectional side view of the canned motor incorporating a can of the present invention therein.
Figure 3:
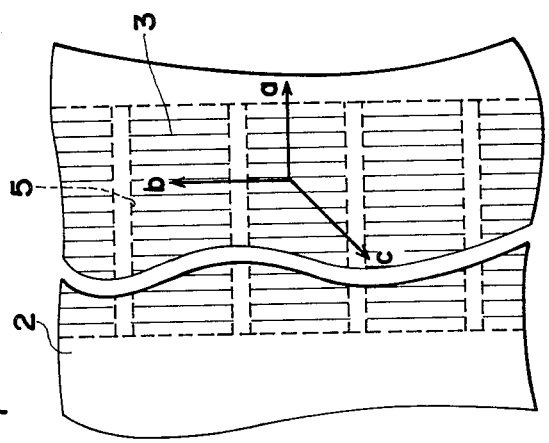
FIG. 3 is an enlarged view showing a part of the developed can body.

The cylindrical can body 2 made of soft magnetic metal plates is arranged to have the magnetically hard direction oriented to the direction into which the stator slot 5 of the motor extends, that is, to the circumferential direction (b) perpendicular to the axial direction (a) of the can body 2 as shown in FIG. 2 and also to have the magnetically easy direction oriented to the normal direction (c) of the can body 2. Some examples of soft magnetic metal plates having such texture can be listed as follows:

| Can materials | Crystal structure | Circumferential direction | Sheet plane orientation |
|---|---|---|---|
| Silicon steel, Ferritic stainless steel etc. | Body centered cubic | <110> <111> | {001} {112} |
| Austenitic ferromagnetic materials, Nickel etc. | Face centered cubic | <110> <001> | {111} {110} |
| Cobalt, Cobalt alloys etc. | Close packed hexagonal | <10.0> | {00.1} |

When the magnetization property is weighed from the practical viewpoint, silicon steel plates are believed most suitable for can materials. However, since the canned motor is often used in the corrosive circumstances, it is more preferable to use anti-corrosive ferritic stainless steel plates. It is particularly advantageous to use anticorrosive soft magnetic metal plates whose magnetization property is improved by adding silicon to ferritic stainless steel. Parmalloy having a face centered cubic structure, cobalt having a hexagonal crystal structure of extremely large anisotropy or the like can be further used.

There will be now explained the function of the can made of the above-mentioned can materials.

When the rotating magnetic field is generated by the coil 4 fitted into the stator slot 5 of the motor 1, the magnetic flux flows from the stator 3 through the cylindrical can body 2 along the normal direction (c) thereof, then through the gap 8, the rotor 6 and again through the gap 8, the can body 2 and back to the stator 3, thus causing the rotor 6 to rotate. The magnetic flux flowing in the direction perpendicular to the rotating axis 7, namely, in the circumferential direction (b) of the cylindrical can body 2 is a useless but detrimental bypass flux in contrast with the main flux flowing in the normal direction (c) of the cylindrical can body 2 and giving a torque to the rotor 6. This bypass flux is arranged in this invention to flow in the magnetically hard direction of the material forming the can body 2 and, therefore, is effectively reduced.

The magnetically easy axes of crystals are generally <110> in the body centered cubic structure, <111> in the face centered cubic structure and <001> in the close packed hexagonal structure, but even though the axis is shifted a little from its direction, that is, <100>, <111> or <001> in each case, magnetization of crystals will never become difficult rapidly but nearly proportional to the cosine of the angular shift. To the contrary, for example, <110> and <111> which are regarded as the magnetically hard axes in the body centered cubic structure have such a feature that magnetization difficulty is rapidly reduced when the axis is only a little shifted from <110> or <111> to <100>.

The easy and hard directions in these cases do not always represent strict crystallographic axes and particularly the hard direction includes all directions shifted enough from the easy axis of the crystals. FIGS. 5 to 7 show the areas including the magnetically easy and hard directions in each case of the body centered cubic structure, the face centered cubic structure and the closs-packed hexagonal structure, said areas being based on the results of property measurements and being conditions with which materials forming the can body 2 must be provided.

We will now describe a method for finding out whether or not the texture of a material, for example, silicon steel plate of the body centered cubic structure can be suitable for the can body 2. FIG. 8 is a standard stereoprojection of cubic crystals. When small circles with a radius of 35° are drawn according to FIG. 8 putting their centers on the easy axes of the crystals such as <001>, <100> and <010>, the areas in the circles correspond to that of the magnetically easy direction. Assuming that a point A in this area be the normal direction of the cylindrical can body 2 having a single texture. Consider a large circle B, C, D, E, F, G drawn taking the point A as its zone axis. C, D, E and F are points where the large circle is intersected with those of radius 35°. If the circumferential direction of the cylindrical can body 2 is included between C and D, or between E and F on the circular arc of the large circle, it can be expected that a can having excellent properties be obtained. It is especially more preferred that the angle between C and D or between E and F is larger. If the large circle showing the cylindrical can body 2 is selected so as not to intersect with the circle which represents the easy direction, analysis can be attained cosidering only the bypass flux. Therefore, it can be understood according to FIG. 8 what kind of textures of materials are suitable for the can body 2.

According to the present invention as described above, the cylindrical can body made of soft magnetic metal plates have the magnetically hard direction oriented to the direction perpendicular to the stator slot of the motor, so that when the can body is fitted into the gap between the stator and the rotor of the motor, generation of the bypass flux flowing in the circumferential direction of the can body is made difficult, while the can body has the magnetically easy direction oriented to the normal direction thereof, so that the otherwise increase in the magnetic gap associated with the introduction of the can body to the motor is reduced, the main flux through the can is directly strengthened and deterioration of the motor efficiency caused by fitting the can body into the motor can be avoided.

Further, it will be pointed out as a feature of metal plates having such textures that they have an excellent anti-corrosion property. It is because the faces normal to the magnetically easy directions have a high atomic density and is chemically most stable. Since the canned motor is often used in the corrosive surroundings, this excellent anti-corrosion property is an extremely advantageous feature together with the excellent magnetic properties. Therefore, the present invention can provide a can having an excellent anti-corrosion property likewise.

In addition, the temperature under which the can body is used must be lower than the Curie's of can materials, and it is expected that lower the temperature becomes higher the magnetization, and the room temperature is low enough in this respect.

The characteristics of the canned motor using the can of the present invention will now be explained. Used for the test was a small three-phase four poles induction motor of 1.5 KW manufactured by Hitachi, Ltd. in Japan in which a space for inserting a cylindrical can therein was provided by cutting the outer circumferential surface of the rotor of 475 mm in radius by 0.4 mm. The cylindrical can was made from a planar plate by connecting both ends thereof to each other by means of a micro-plasma welding machine. The can was mounted in the motor and fixed to the stator by using hydro pressure.

The properties of the canned motors using cans of $\alpha$-iron such as silicon steel etc. are shown. In the test, the electrical properties of the canned motors were measured and also the textures of the cans were examined by X-ray diffraction. The electrical test consisted of a light running examination and restriction examination. A current flowing through the motor coil, slip angle, power-factor and efficiency of motor were calculated by using a circle diagram from the electric properties obtained from said electrical test.

Figure 9:
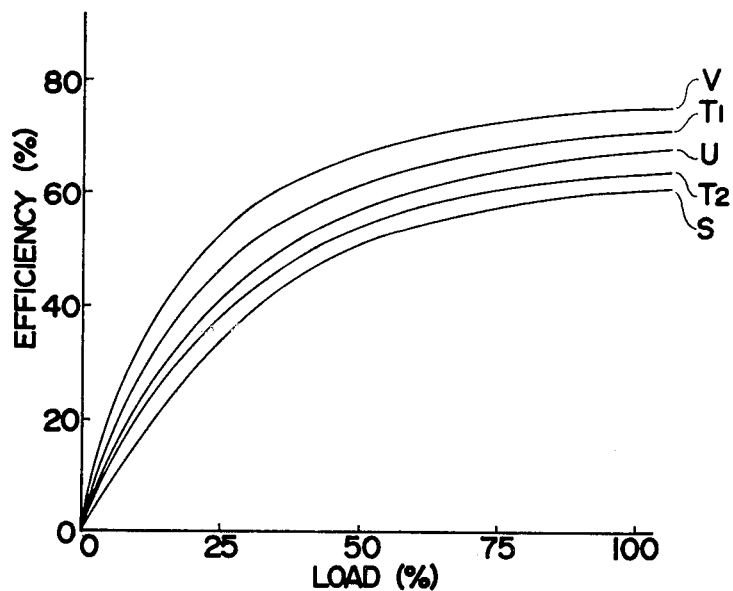
FIG. 9 is a diagram showing characteristic curves of the canned motor in cases when many kinds of cans are used.

As an example, the efficiencies of motors showing a collective performance of motor are shown in FIG. 9. In FIG. 9, the values were corrected so as to show the properties of the motors each having a can of 0.4 mm in thickness in order to facilitate the comparison, through the cans actually used in the canned motors were of 0.3 -0.4 mm in thickness.

In FIG. 9, S designates a curve in case that an austenitic stainless steel is used for a can material and corresponds to a property of the conventional canned motor. $T_1$ shows a curve in case that a 3% silicon steel having a texture in which the circumferential direction of can is about {110} is used for a can material. $T_2$ shows a curve in case that a 3% silicon steel having a texture in which the circumferential direction of can is about <110> is used.

U and V show curves in each case that a 3% silicon steel having a texture not the same with that of the curve $T_1$ or $T_2$.

Figure 10:
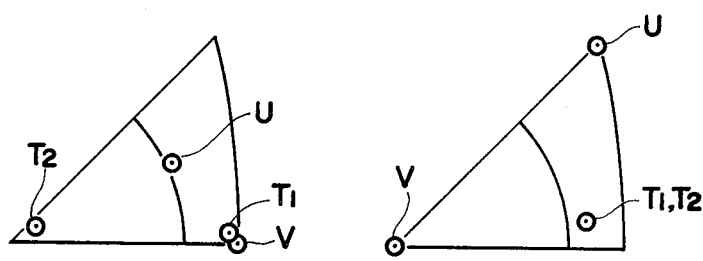
FIG. 10(a) is a stereo-projection chart of crystals in a circumferential direction of the cylindrical can.
FIG. 10(b) is a stereo-projection chart of crystal in a normal direction of the can.

FIG. 10(a) shows a texture in a circumferential direction of can and FIG. 10(b) shows a texture in a normal direction of can. The normal direction of can of $T_1$ or $T_2$ is the magnetically hard direction because it is near to <110>. However, $T_2$ has an excellent property because the circumferential direction of can is the magnetically easy direction, compared with $T_1$ in which the circumferential direction is the magnetically hard direction. U is positioned in property between $T_1$ and $T_2$, because the normal direction of the U is <111> and the magnetically hard direction but the circumferential direction is near to the border of the magnetically easy region and the magnetically hard region.

V has the most excellent property because the can is made of silicon steel and the circumferential direction thereof is <011> and the magnetically hard direction as well as the normal direction is <100> and the magnetically easy direction.

The same results were observed with respect to the ferritic stainless steel etc..

FIG. 10(a) and FIG. 10(b) show preferable ranges in the circumferential direction and normal direction of the can for use in a canned motor.

We claim:

1. A can for use in a canned motor wherein a cylindrical can body made of soft magnetic metal plate having a crystalline structure which is arranged to have the magnetically hard direction of the plate oriented to the circumferential direction of said cylindrical can body, said circumferential direction being perpendicular to the stator slots of said motor, said crystalline structure being such that: when the material of said metal plate has a body centered cubic crystal structure, a direction different by more than 35° from the direction of the crystal axis <001> is in parallel to said circumferential direction of said cylindrical can body; when said metal plate has a face centered cubic structure, a direction different by more than 35° from the direction of the crystal axis <111> is in parallel to said circumferential direction of said cylindrical can body; and when said metal plate has a hexagonal closepacked structure, a direction different by more than 60° from the direction of the crystal axis <00.1> is in parallel to said circumferential direction.

2. A can for use in a canned motor claimed in claim 1 wherein said soft magnetic metal plate is silicon steel.

3. A can for use in a canned motor claimed in claim 1 wherein said soft magnetic metal plate is ferritic stainless steel.

4. A can for use in a canned motor claimed in claim 1 wherein said soft magnetic metal plate is ferritic stainless steel with added silicon.

5. A can for use in a canned motor wherein a cylindrical can body made of a soft magnetic metal plate having a crystalline structure which is arranged to have the magnetically hard direction of the plate oriented to the circumferential direction of said cylindrical can body, said circumferential direction being perpendicular to the stator slots of said motor, and to have the magnetically easy direction of the plate oriented to the normal direction thereof, said crystalline structure being such that: when said metal plate has a body centered cubic crystal structure, a direction different by less than 35° from the direction of the crystal axis <001> is in parallel to a direction normal to the surface of said can body; when said metal plate has a face centered cubic structure, a direction different by less than 35° from the direction of the crystal axis <111> is in parallel to the direction normal to the surface of said can body; and when said metal plate has a hexagonal closepacked structure, a direction different by less than 60° from the direction of the crystal axis <00.1> is in parallel to the direction normal to said surface.

6. A can for use in a canned motor claimed in claim 5 wherein said soft magnetic metal plate is silicon steel.

7. A can for use in a canned motor claimed in claim 5 wherein said soft magnetic metal plate is ferritic stainless steel.

8. A can for use in a canned motor claimed in claim 5 wherein said soft magnetic metal plate is ferritic stainless steel with added silicon.

* * * * *